United States Patent [19]

Oya

[11] Patent Number: 5,463,476
[45] Date of Patent: Oct. 31, 1995

[54] IMAGE PROCESSING SYSTEM

[75] Inventor: Kazuhiro Oya, Kanagawa, Japan

[73] Assignee: Fuji Xerox Co., Ltd., Tokyo, Japan

[21] Appl. No.: 597,257

[22] Filed: Oct. 10, 1990

[51] Int. Cl.[6] .................................................. H04N 1/41
[52] U.S. Cl. ...................... 358/426; 358/404; 358/444; 358/442; 358/452
[58] Field of Search ................................. 358/401, 403, 358/404, 442, 444, 452, 426

[56] References Cited

U.S. PATENT DOCUMENTS

| | | | |
|---|---|---|---|
| 4,617,596 | 10/1986 | Yoshida et al. | 358/451 |
| 4,748,513 | 5/1988 | Yamada | 358/444 |
| 4,760,608 | 7/1988 | Suzuki | 358/452 |
| 4,814,898 | 3/1989 | Arimoto et al. | 358/426 |
| 4,878,123 | 10/1989 | Miura et al. | 358/401 |

Primary Examiner—Edward L. Coles, Sr.
Assistant Examiner—Thomas L. Stoll
Attorney, Agent, or Firm—Finnegan, Henderson, Farabow, Garrett & Dunner

[57] ABSTRACT

An image processing system having a data compressor for selectively compressing image data, data storage for selectively storing the compressed data from the data compressor, a page buffer for storing the compressed data to be stored into and read out of the data storage, a data decompressor for selectively decompressing the compressed image data back into its original form, and a controller for controlling the operation of the compressor, data storage, and decompressor, in either of two modes, a processing mode in which the image data is compressed by the compressor, stored in the data storage, and decompressed by the decompressor, and a through mode in which the image data bypasses the compressor, the data storage, and the decompressor. The controller selects one of the two modes based the number of original documents bearing the image data, the number of copies of the original documents requested by a user, and whether editing is to be performed on the image data.

17 Claims, 4 Drawing Sheets

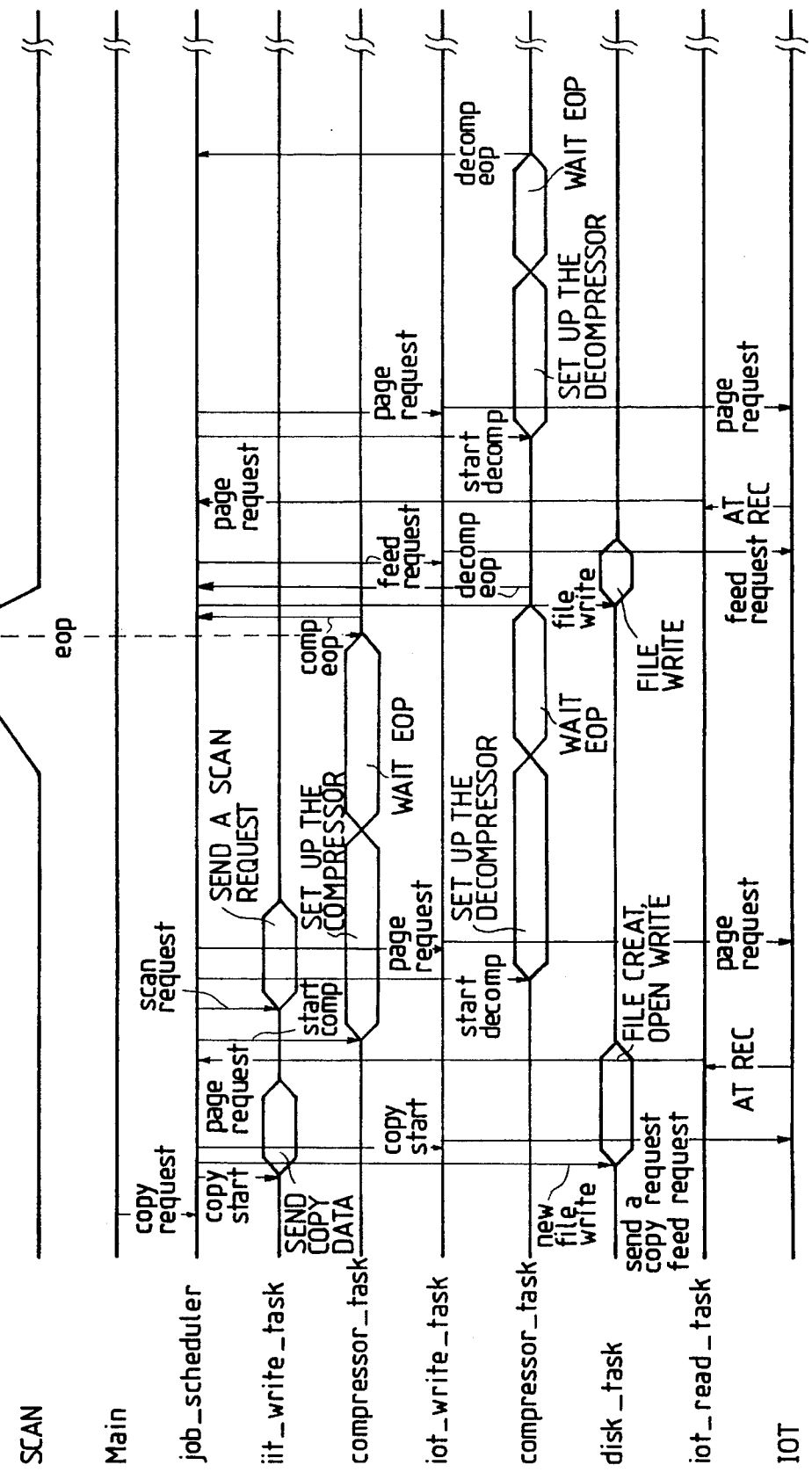

IMAGE PROCESSING SYSTEM

BACKGROUND OF THE INVENTION

1. Field of the Invention

The present invention relates to an image processing system of the type in which image data as read by an image reader is compressed, and stored into a memory of a large memory capacity, and the image data is repeatedly read out of the memory and is transferred to an image output terminal.

2. Discussion of the Related Art

RDH's (recirculating document handlers) are known in the art. In the conventional RDH, a set of original documents is repeatedly read by an automatic image reader, and a requested number of copies of the set of documents is produced. Therefore, when the number of copies is increased, the number of times the documents are handled is increased, and thus, the likelihood of damaging the documents is increased. An electronic RDH can produce the requested number of copies while handling the documents only one time. In the electronic RDH, a data storage unit is provided for storing the image data as it is read. The memory capacity of the storage unit is desirably large. For this reason, a magnetic memory device, such as a hard disk, is used. Of course, a semiconductor memory may also be used. To output a requested number of copies, a set of original documents is read one time in the presented order, and the image data is stored in the storage unit. The image data stored is repeatedly read out of the storage unit in the presented order, and transferred to the image output terminal. The image output terminal produces the requested number of copies.

Since the image data may contain a tremendous amount of information, the memory capacity of the storage unit must be extremely large in order to store the image information of a plurality of original documents. To solve this problem, the combination of a compressor and a decompressor is used to compress the data and then to decompress the compressed data. The compressor compresses the data to reduce the amount of image data to be stored into the storage unit. The image data read out of the storage unit is then decompressed into the original form. The decompressed data is transferred to the image output terminal.

In the magnetic memory device, such as a hard disk, an access time including a seek time and the like is approximately 1M byte/sec. A normal signal transfer time is 10M bytes/sec. Thus, a speed gap exists between the access time and the transfer time. To cope with the speed gap, a page buffer is provided. The compressed data from the compressor is temporarily stored into the page buffer for every page of the document. After the storage of the image data into the hard disk is completed, the data is read out of the hard disk into the page buffer for every page of the document. Then, it is sent to the decompressor. The decompressed image data is transferred to the image output terminal.

In the image processing system of the type in which the data is stored in the hard disk sequentially for every one page of data, through the page buffer, and then is read out of the disk, the time taken for the reading and writing of data from and to the disk impedes the copy output.

Editing commands, such as "cut and paste", masking, and "pickup and move", are difficult for the RDH, as described above to handle. The image data as read by the image reader is input to the control unit of the image processing system in a real time manner, and stored in a data storage unit. Therefore, the image data is read out of the storage unit and is used for the editing. Since the stored data is the compressed data, positional information in a coordinate system cannot be obtained from the compressed data. The same is true for image data rotation. For this reason, to perform editing, the compressed data must be read out of a storage unit and decompressed. The decompressed data is developed into bit map data, and loaded into a page buffer. To this end, a page buffer for editing must be additionally provided. This leads to an increase in the cost of manufacturing.

SUMMARY OF THE INVENTION

The present invention has been made in view of the above circumstances and has an object to provide a quick and smooth copy output by controlling the transfer of image data, and the compressor and the decompressor according to the number of documents.

Another object of the present invention is to enable page editing without any additional page buffers.

Additional objects and advantages of the present invention will be set forth in part in the description which follows and in part will be obvious from the description, or may be learned by practice of the invention. The objects and advantages of the invention may be realized and attained by means of the instrumentalities and combination particularly pointed out in the appended claims.

To achieve the objects and in accordance with the purpose of the present invention, as embodied and broadly described herein, an image processing system is provided that comprises means for receiving image data, means for selectively compressing the image data, means for selectively storing the compressed image data, means for selectively decompressing the compressed image data back into its original form, means for printing an image of the image data, and control means for controlling the operation of the means for selectively compressing, storing, and decompressing, in either of two modes, a processing mode in which the image data is compressed by the compressing means, stored in the storing means, and decompressed by the decompressing means, and a through mode in which the image data bypasses the compressing means, the storing means, and the decompressing means.

In the image processing system of the present invention, the control means controls the operation modes of the data compressing means, data decompressing means, page buffer, and data storage means according to a page edit mode, the number of original documents bearing the image data, and the number of copies that are designated by a user. In the page edit mode, the image data that is not compressed, may be stored into the page buffer, to simplify the page edit. Where the number of original documents and the number of copies are small, the image data is transferred from the page buffer to the data decompressing means, bypassing the data storage means. This feature improves the data processing speed for image output.

BRIEF DESCRIPTION OF THE DRAWINGS

The accompanying drawings, which are incorporated in and constitute a part of this specification illustrated embodiment of the invention and, together with the description, serve to explain the object, advantages and principles of the invention. In the drawings.

DETAILED DESCRIPTION OF THE PREFERRED EMBODIMENTS

Figure 1:
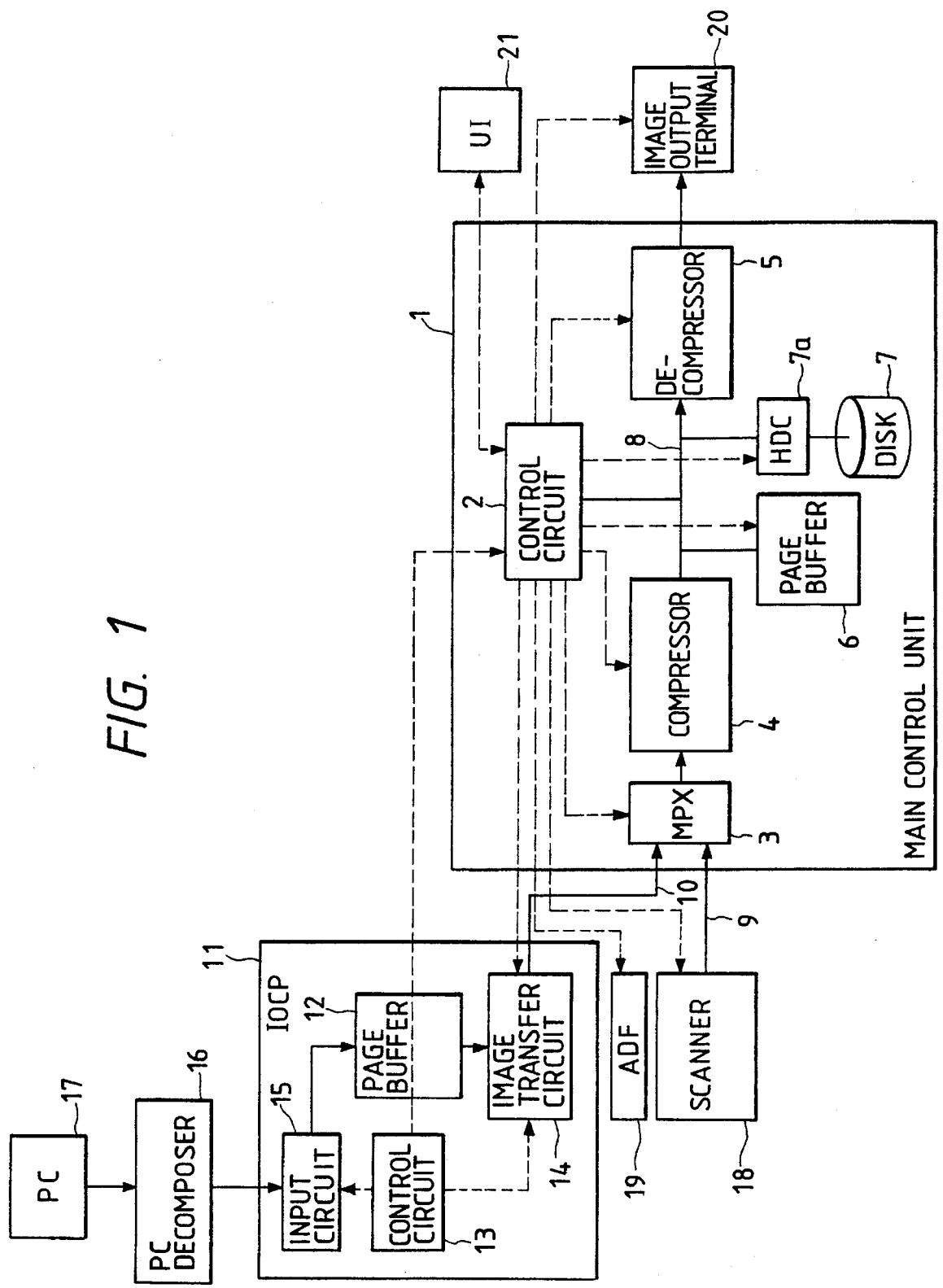
FIG. 1 is a block diagram showing an arrangement of an image processing system according to an embodiment of the present invention.

In FIG. 1, a main control unit 1 is made up of a multiplexer (MPX) 3 for selecting image data from an image input terminal (IIT), or external devices, such as a personal computer (PC) and a facsimile machine (FAX), a compressor 4 for compressing image data, a decompressor 5 for decompressing the compressed image data into original image data, a page buffer 6, a disk 7 having a large capacity memory, and a control circuit 2.

A scanner 18 is an image reader for reading an image on a document by using a CCD line sensor, for example. The scanner 18 executes the following items: offset and gain adjustments of the read signal; analog to digital conversion of image data; gap correction; shading correction; and the like. When it reads the document images in a color mode, the scanner executes the following items: gathering separated color image data; offset and gain adjustments of the image data signals; analog to digital conversion of image data signal; gap correction; shading correction; END (equivalent neutral density) conversion; color masking; document size detection; color change; UCR (under color removal); black generation; mesh-dot removal; edge emphasis; TRC (tone reduction control); enlargement/reduction; editing; and the like. An ADF (automatic document feeder) 19 automatically feeds original documents to the system.

An image output terminal 20, which is a laser printer, for example, reproduces a half tone image in the form of the colligation of mesh dots by controlling every pixel (picture element) by modulating a laser beam according to two-level data as generated from the image data.

A PC 17 is a personal computer. A PC decomposer 16 develops the code data from the PC 17 into bit map data. An IOCP 11 is an external device controller made up of an input circuit 15 for PC image data, page buffer 12, image transfer circuit 14, and a control circuit 13. The IOCP 11 reads the image data from the page buffer 12 and outputs the data.

A user interface (U/I) 21 includes a display, a control panel, and the like. By using the U/I 21, a user may enter various functions and editing commands, and may review the present operating states of the system.

The multiplexer 3 is provided for selectively connecting an image bus 8 to a scanner image bus 9 or an IOCP image bus 10.

The compressor 4 operates in a compression mode or a through mode, and compresses data on the basis of an adaptable predictive coding system. The compressor 4 includes plural kinds of predictors used in a predetermined order. In the adaptable predictive coding system, the data pattern of the predictor is compared with the image data for every pixel or unit of pixels by the predictor If no error occurs, "0" is assigned to an error data to execute run-length coding and the predictor is used continuously to compress the image data. On the other hand, if any error occurs, an error data code corresponding to the error data is assigned and the predictor is changed to the next predictor to compare the image data. The compressed data is decompressed or expanded into the original image data by a decompressor 5 including a plurality of kinds of reverse predictors used in a predetermined order.

The decompressor (or expander) 5 operates in a decompression mode or a through mode, and decompresses the compressed image data into its original form.

The page buffer 6 is capable of storing the images of several pages of a document. The page buffer 6 temporarily stores the image data before it is written into the disk 7 and after it is read out of the disk. When the image data is not written into the disk 7 and is subjected to editing, such as alter and replace, under control of the control circuit 2, the page buffer 6 is used for temporarily storing the image data.

The disk 7 is a large capacity memory for storing a great amount image data. The writing and reading of image data to and from the disk 7 is controlled by a disk controller HDC.

The data stored in the disk 7 is two- and multi-level image data, and code data, for example. The code data that is not developed into bit map data is transferred from the IOCP image bus 10 through the multiplexer 3 and the compressor 4 to the system. In this case, the compressor 4 is placed in the through mode. The through mode is also used when the image data from the compressor 5 is directly loaded into the page buffer 6 for output, and thus, the image data is not compressed and decompressed by the compressor and the decompressor 5.

Figure 2:
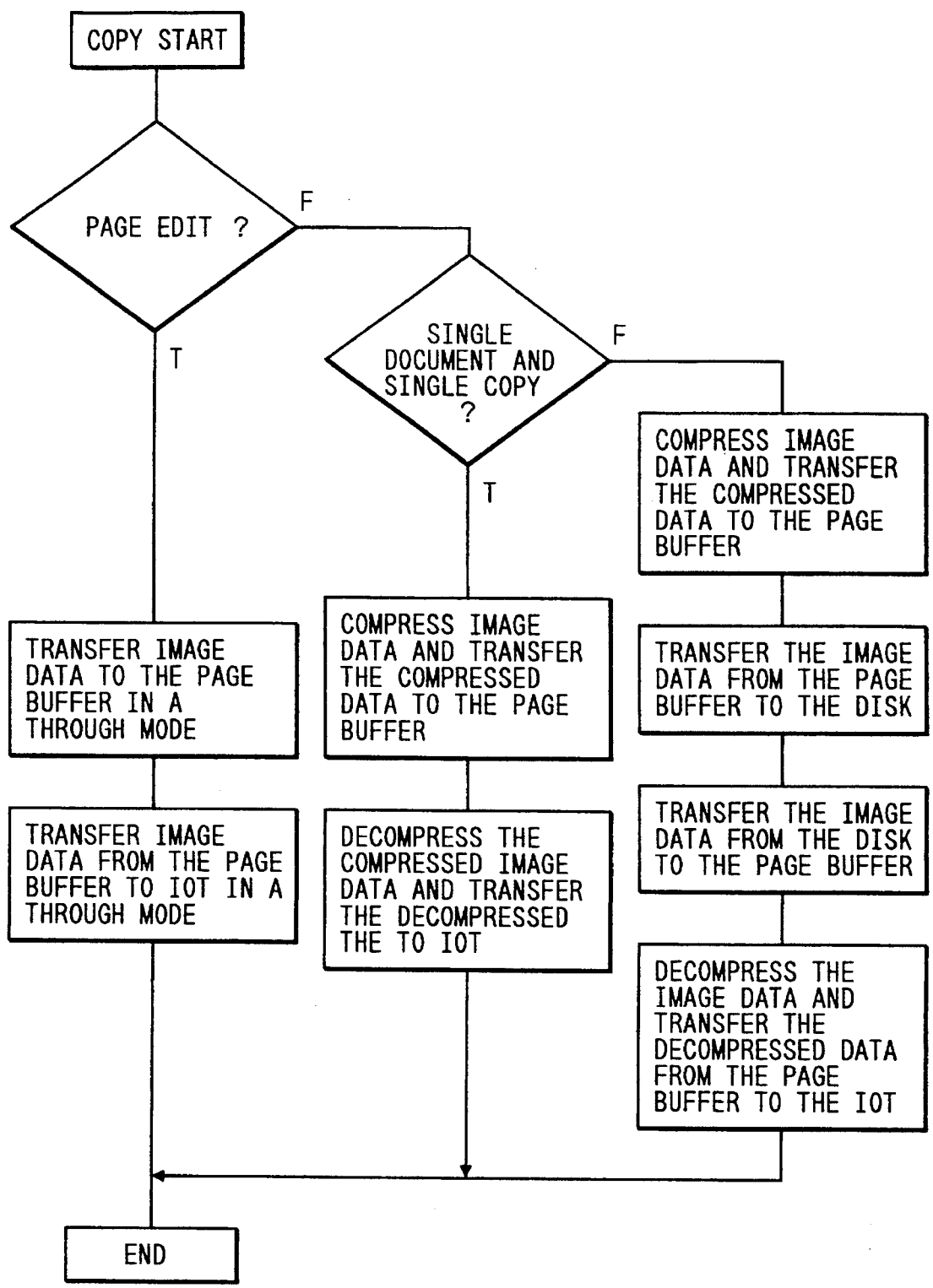
FIG. 2 is a flow chart useful in explaining the operation modes of the compressor and the decompressor, and the transfer control of the image data.

In operation, an edit and other copy modes are designated from the U/I 21, and a copy start key is pushed. Then, the image processing system starts a copy operation. The control unit 1 checks whether a designated mode is a page edit mode, single document mode or a single copy mode, as shown in FIG. 2.

When the page edit mode is designated, the compressor 4 and the decompressor 5 are set in a through mode. In this mode, the image data output from the scanner 18 is transferred to the page buffer 6. In the page buffer 6, the page editing is carried out. The edited image data is transferred from the page buffer 6 to the image output terminal 20.

When the single document mode or single copy mode is designated, the compressor 4 and the decompressor 5 are set in a through mode. In this mode, the image data output from the scanner 18 is transferred to the page buffer 6. The image data is read out of the page buffer 6 and transferred to the image output terminal 20.

When none of the above modes are designated, the image data output from the scanner 18 is compressed by the compressor 4 and the compressed data is transferred to the page buffer 6, and then to the disk 7. Upon completion of the data storage, the compressed data is read out of the disk 7 the number of times corresponding to the number of copies, and stored into the page buffer 6. Then, the compressed data is decompressed by the decompressor 5, and transferred to the image output terminal 20.

When an image of an original document is read by the scanner 18, and a single copy of it is produced, the compressor 4 and the decompressor 5 are set in the through mode. The image data is directly transferred from the scanner image bus 9 to the image output terminal 20, bypassing the multiplexer 3, compressor 4, and decompressor 5.

When a plurality of copies of an original document are to be produced, the time required for producing the plurality of copies may be reduced by decompressing the compressed data and transferring the decompressed data to the image output terminal at the same time the compressed data is stored in the disk 7. Thus, the first copy may be produced without a delay associated with writing and reading the compressed data to and from the disk 7.

In the following example, two copies are produced from an original sheet. As shown in FIG. 3(A), a job scheduler issues a copy start command to an IIT write task and an IOT write task, and issues a new file write command to a disk task. In response to the copy start command, the IOT write task sends a copy data request and a feed request to the IOT. When a paper is fed into a registration position in the IOT, the IOT read task issues a page request to the job scheduler. In response to this, the job scheduler starts a compressor task and a decompressor task, and sends a scan request to an IIT write task. At the same time, the job scheduler sends a page request to the IOT write task. Then, the IOT write task sends a registration request to the IOT.

When the compressor and the decompressor are set up, the compressor task and the decompressor task wait for an end of page (EOP) command that is issued by the scanner when it completes the scan, and sends an end of page (EOP) command to the job scheduler. Upon receiving the EOP command, the job scheduler sends a file write to the disk task and a feed request to the IOT write task. The IOT task sends a feed request to the IOT.

When a paper is set at the registration position in the IOT, the IOT read task sends a page request to the job scheduler. To produce a second copy, the job scheduler starts only the decompressor, and at the same time sends a page request to the IOT write task. The IOT write task sends a registration request to the IOT. Then, the job scheduler waits for an end of page (EOP) command from the decompressor. The sequence of operations as mentioned above is repeated for third and subsequent copies.

Figure 3B:
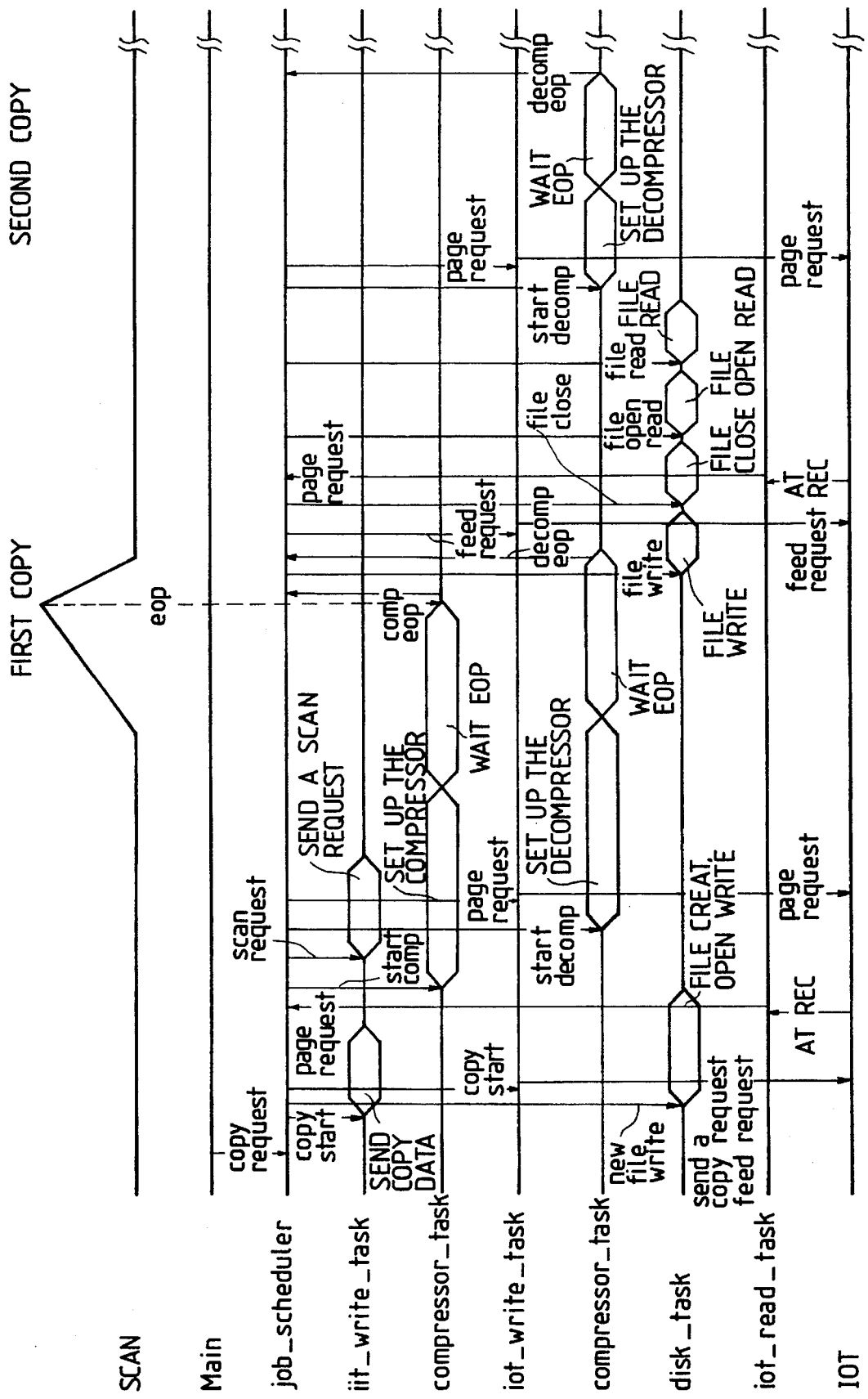
FIGS. 3(a) and (b) are diagrams for comparatively explaining the operation of the image processing system of the invention and the conventional image processing system.

To write data into the disk, as shown in FIG. 3(B), the Job scheduler sends to a disk task a file close, file open read, and file read every time the data is written. With those commands issued, the output time is proportionally increased, and consequently the first copy output is delayed by that time.

In reading an original document, the scanner 18 scans the original document two times. The first scan is a prescan, and the second is a main scan. After each scan, the scanner must return to the start position. The image data read during the main scan is transferred to a scanner image bus 9. However, the data read during the prescan is not transferred to the scanner image bus 9 because the data contains document size, edit marks, area read, and the like, and is processed only within the scanner 18. Accordingly, the scanner image bus 9 is idle during the time periods of the prescan and the scan return.

The image data from the PC can be processed during the time period in which the scanner 18 is operating. However, the image bus must be switched from the scanner image bus 9 to the IOCP image bus 10 by the multiplexer 3, and the processing must occur during the prescan and the scan return of the scanner 18. Further, when a plurality of copies of an original document are to be produced, the scanner 18 reads the document only once and then stops operating. During this period, however, the job code is still being executed, the data is read out of the disk 7, and the image output processing continues. The image bus is also busy during this period.

When the scanner 18 reads an image in the main scan mode or when a copy job for the plurality of copies is being executed, if the code data comes in from the PC 17, the code data is stored in the page buffer 12 in the IOCP 11 until the transfer of the code data is possible. The PC data is divided into data segments each having such a size as to be readily transferable. These data segments are then transferred during the idle time of the scanner 18.

The parallel processing of the image data is performed in the following manner:

1) The PC decomposer 16 receives the code data from the PC 17, and develops it into bit map data. The IOCP 11 stores the bit map data in the page buffer 12.

2) The control circuit 13 of the IOCP 11 sends a signal to the control circuit 2 in the main control unit 1 requesting that the control circuit 2 read the PC image data.

3) At this time, if the scanner 18 is not operating, the control circuit 2 instructs the multiplexer 3 to select the IOCP image bus 10, and reads the image data from the page buffer 12 of the IOCP 11. The image data is stored in the disk 7 via the image bus 10, multiplexer 3, compressor 4 and the page buffer 6. If the image output terminal 20 is not being used, the control circuit 2 reads the image data from the disk 7, and transfers it, through the page buffer 6 and the decompressor 5 to the image output terminal 20.

4) If the scanner 18 is operating, the control circuit allows the scanner operation to continue, and at the completion of the image read by the scanner 18, instructs the ADF 19 to change the document. Further, the control circuit sends to the IOCP 11 a signal permitting it to transfer the divided image signal. Then, the control circuit 2 sets the multiplexer 3 to the image bus 10. A first half of the image data is read out of the page buffer 12, and transferred through the IOCP image bus 10. Then, the image data is stored into the disk 7 via the multiplexer 3, compressor 4, and page buffer 6, under control of the control circuit 2. The above sequence of operations is repeated for the second half of the image data.

5) After the scanned image data has been transferred to the image output terminal 20, the control circuit 2 reads the PC image data out of the disk 7 and loads it in the page buffer 6, and then transfers it to the image output terminal 20.

It should be understood that the present invention may be changed, modified and altered within the scope of the invention. While in the above-mentioned embodiment, the data handled is the image data as read by an image reader, the invention may be applied for the code data generated by personal computers and facsimile machines.

As seen from the foregoing description, to perform page editing, the compressor is set in a through mode, and the image data is stored in the page buffer before being compressed. Accordingly, the page editing can be performed without any additional page buffers. When a single copy of a single document is to be produced, only the page buffer intervenes in the transfer of the image data. In other words, the writing and reading of the data to and from the disk does not occur. This feature contributes to an increase the image output speed.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system comprising:

means for receiving image data;

means for selectively compressing said image data;

means for selectively storing the compressed image data;

means for selectively decompressing the compressed image data back into its original form;

means for printing an image of said image data; and control means for controlling the operation of said means for selectively compressing, storing, and decompressing, in either of two modes, a processing mode in which the image data is compressed by said compressing means, stored in said storing means, and decompressed by said decompressing means, and a through mode in which the image data bypasses said compressing means, said storing means, and said decompressing means, one of said two modes being selected based on the number of original documents bearing said image data, the number of copies of the original documents requested by a user, and whether editing is to be performed on said image data.

2. The image processing system of claim 1, wherein said control means selects said through mode when a single copy of a single document is to be produced.

3. The image processing system of claim 1, wherein said control means selects said through mode when editing is to be performed on said image data.

4. The image processing system of claim 1, wherein said control means selects said processing mode when more than one copy of said original document is to be produced.

5. The image processing system of claim 1, wherein said compressed image data is read from said storing means a number of times corresponding to the number of copies of said original document requested by a user.

6. The image processing system of claim 1, wherein said receiving means receives said image data from one of a personal computer, a facsimile machine, a monochromic scanner, and a color scanner.

7. An image processing system comprising:

means for receiving image data;

means for selectively compressing said image data;

means for selectively storing the compressed image data;

a page buffer for storing the data to be stored in and read out of said data storing means;

means for selectively decompressing the compressed image data back into its original form;

means for printing an image of said image data; and control means for controlling the operation of said means for selectively .compressing, storing, and decompressing, in either of two modes, a processing mode in which the image data is compressed by said compressing means, stored in said storing means, and decompressed by said decompressing means, and a through mode in which the image data bypasses said compressing means, said storing means, and said decompressing means, one of said two modes being selected by the control means based on the number of original documents bearing said image data, the number of copies of the original documents requested by a user, and whether editing is to be performed on said image data.

8. The image processing system of claim 7, wherein said control means selects said through mode when a single copy of a single document is to be produced.

9. The image processing system of claim 7, wherein said control means selects said through mode when editing is to be performed on said image data.

10. The image processing system of claim 7, wherein said control means selects said processing mode when more than one copy of said original document is to be produced.

11. The image processing system of claim 7, wherein said page buffer stores said image data as received from said receiving means and sends said image data to said printing means when said control means selects said through mode.

12. The image processing system of claim 11, wherein said image data stored in said page buffer is subject to editing prior to printing.

13. The image processing system of claim 7, wherein said page buffer stores said compressed image data as received from said compressing means and sends said compressed image data to said storing means when said control means selects said processing mode.

14. The image processing system of claim 13, wherein said page buffer stores said compressed image data as received from said storing means and sends said compressed image data to said decompressing means when said control means selects said processing mode.

15. The image processing system of claim 7, wherein said compressed image data is sent to said decompressing means from said compressing means at the same time said compressed image data is stored in said storing means when said control means selects said processing mode.

16. The image processing system of claim 7, wherein said compressed image data is read from said storing means a number of times corresponding to the number of copies of said original document requested by a user.

17. The image processing system of claim 7, wherein said receiving means receives said image data from one of a personal computer, a facsimile machine, a monochromic scanner, and a color scanner.

* * * * *